/

US010587828B2

(12) United States Patent
Ulaganathan et al.

(10) Patent No.: US 10,587,828 B2
(45) Date of Patent: Mar. 10, 2020

(54) SYSTEM AND METHOD FOR GENERATING DISTORTION FREE IMAGES

(71) Applicant: Wipro Limited, Bangalore (IN)

(72) Inventors: Sethuraman Ulaganathan, Tamil Nadu (IN); Manjunath Ramachandra, Bangalore (IN); Prasanna Hegde, Karnataka (IN); Adrita Barari, Kolkata (IN)

(73) Assignee: Wipro Limited, Bangalore (IN)

( * ) Notice: Subject to any disclaimer, the term of this patent is extended or adjusted under 35 U.S.C. 154(b) by 0 days.

(21) Appl. No.: 15/674,092

(22) Filed: Aug. 10, 2017

(65) Prior Publication Data
US 2018/0376084 A1 Dec. 27, 2018

(30) Foreign Application Priority Data

Jun. 27, 2017 (IN) .............................. 201741022467

(51) Int. Cl.
*H04N 5/357* (2011.01)
*G06K 9/66* (2006.01)
(Continued)

(52) U.S. Cl.
CPC ............. *H04N 5/3572* (2013.01); *G06K 9/66* (2013.01); *G06T 5/50* (2013.01); *H04N 5/2171* (2013.01); *H04N 5/2258* (2013.01); *H04N 5/23232* (2013.01); *G06T 2207/10052* (2013.01); *G06T 2207/20081* (2013.01);
(Continued)

(58) Field of Classification Search
CPC ............... H04N 5/3572; H04N 5/2258; H04N 5/23232; H04N 5/247; G06K 9/66
See application file for complete search history.

(56) References Cited

U.S. PATENT DOCUMENTS 8,289,409 B2 10/2012 Chang
8,339,470 B2 * 12/2012 Narayanan ............. H04N 5/345
348/218.1
(Continued)

OTHER PUBLICATIONS

Fu, et al., "Clearing the Skies: A Deep Network Architecture for Single-Image Rain Removal", Sep. 2016, pp. 1-11, vol. 1, Retrieved from the Internet:< https://pdfs.semanticscholar. org/9372bbf7ff37c968905d5471ffa49cd07a09525b.pdf>.
(Continued)

*Primary Examiner* — Nhan T Tran
(74) *Attorney, Agent, or Firm* — Pepper Hamilton LLP

(57) ABSTRACT

A camera for generating distortion free images and a method thereof is disclosed. The camera includes a plurality of lenses, wherein each of the plurality of lenses has a dedicated sensor. The camera further includes a processor communicatively coupled to the plurality of lenses. The camera further includes a memory communicatively coupled to the processor and having instructions stored thereon, causing the processor, on execution to capture a plurality of images through the plurality of lenses and to generate a single distortion free image from the plurality of images based on a deep learning technique trained using a mapping of each of a plurality of sets of low resolution images generated in one or more environments to an associated distortion free image, wherein one or more low resolution images in each of the plurality of sets are distorted.

19 Claims, 10 Drawing Sheets

(51) Int. Cl.
*H04N 5/232* (2006.01)
*H04N 5/225* (2006.01)
*H04N 5/217* (2011.01)
*G06T 5/50* (2006.01)
*H04N 5/247* (2006.01)

(52) U.S. Cl.
CPC ............... *G06T 2207/20084* (2013.01); *G06T 2207/20221* (2013.01); *H04N 5/247* (2013.01)

(56) References Cited

U.S. PATENT DOCUMENTS

| | | | |
|---|---|---|---|
| 8,797,417 | B2 | 8/2014 | Gayko et al. |
| 2005/0068448 | A1* | 3/2005 | Steinberg ............... G06K 9/346 348/335 |
| 2011/0080487 | A1* | 4/2011 | Venkataraman ..... H04N 5/2253 348/218.1 |
| 2011/0268369 | A1* | 11/2011 | Richards ................. G06T 5/005 382/284 |
| 2011/0273582 | A1* | 11/2011 | Gayko .................... G06T 5/005 348/222.1 |
| 2015/0296137 | A1* | 10/2015 | Duparre ............. H04N 5/23238 348/48 |
| 2016/0165101 | A1* | 6/2016 | Akiyama ........... H04N 5/23229 348/187 |
| 2017/0126972 | A1* | 5/2017 | Evans, V ........... H04N 5/23238 |
| 2018/0315167 | A1* | 11/2018 | Akiyama ................. G06T 5/00 |

OTHER PUBLICATIONS

Webster, et al, "Improved Raindrop Detection Using Combined Shape and Saliency Descriptors With Scene Context Isolation", 2015, 5 pages, IEEE, Retrieved from the Internet:<http://breckon.eu/toby/publications/papers/webster15raindrop.pdf>.

Eigen, et al., "Restoring an Image Taken Through a Window Covered with Dirt or Rain", pp. 1-8, Retrieved from the Internet:<http://www.cs.nyu.edu/~deigen/rain/restore-iccv13.pdf>.

* cited by examiner

SYSTEM AND METHOD FOR GENERATING DISTORTION FREE IMAGES

This application claims the benefit of Indian Patent Application Serial No. 201741022467, filed Jun. 27, 2017, which is hereby incorporated by reference in its entirety.

FIELD

This disclosure relates generally to image generation and more particularly to cameras for generating distortion free images and methods thereof.

BACKGROUND

Image generation algorithms generally fail when input images are distorted by huge noise, for example, lens rain drop distortion, blur, or other obscurities. By way of an example, video surveillance system may fail if a captured video is highly distorted because of rain drop noise on the lens of a camera. This leads to failure of the system in real time usage.

Camera based imaging systems are commonly used in vehicles (for example, dash cameras). With advancement of processor technology and availability of algorithms for Advanced Driver Assistive System (ADAS) and self-driving cars, these imaging systems have become more and more relevant. In ADAS and self-driving cars, the role of these imaging system have been extended from assistance to decision making, which demands for greater reliability and accuracy.

However, imaging system in vehicles are generally exposed to outside environment, for example, rain drops, dirt, or mud, resulting in partial or complete occlusion or distortion of the captured images. Convention computer vision algorithms fail to perform well if the input image is distorted because of exposure to the outside environment. This leads to reduced accuracy or even failure of decision making system in vehicles.

SUMMARY

In one embodiment, a method of generating distortion free images is disclosed. The method includes capturing a plurality of images through a plurality of lenses in a camera, wherein each of the plurality of lenses has a dedicated sensor. The method further includes generating, by the camera, a single distortion free image from the plurality of images based on a deep learning technique trained using a mapping of each of a plurality of sets of low resolution images generated in one or more environments to an associated distortion free image, wherein one or more low resolution images in each of the plurality of sets are distorted.

In another embodiment, a camera is disclosed. The camera includes a plurality of lenses, wherein each of the plurality of lenses has a dedicated sensor. The camera further includes a processor communicatively coupled to the plurality of lenses. The camera includes a memory communicatively coupled to the processor and having instructions stored thereon, causing the processor, on execution to capture a plurality of images through the plurality of lenses and to generate a single distortion free image from the plurality of images based on a deep learning technique trained using a mapping of each of a plurality of sets of low resolution images generated in one or more environments to an associated distortion free image, wherein one or more low resolution images in each of the plurality of sets are distorted.

In yet another embodiment, a non-transitory computer-readable storage medium is disclosed. The non-transitory computer-readable storage medium has instructions stored thereon, a set of computer-executable instructions causing a camera that includes one or more processors to perform steps including capturing a plurality of images through a plurality of lenses in the camera, wherein each of the plurality of lenses has a dedicated sensor; and generating a single distortion free image from the plurality of images based on a deep learning technique trained using a mapping of each of a plurality of sets of low resolution images generated in one or more environments to an associated distortion free image, wherein one or more low resolution images in each of the plurality of sets are distorted.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
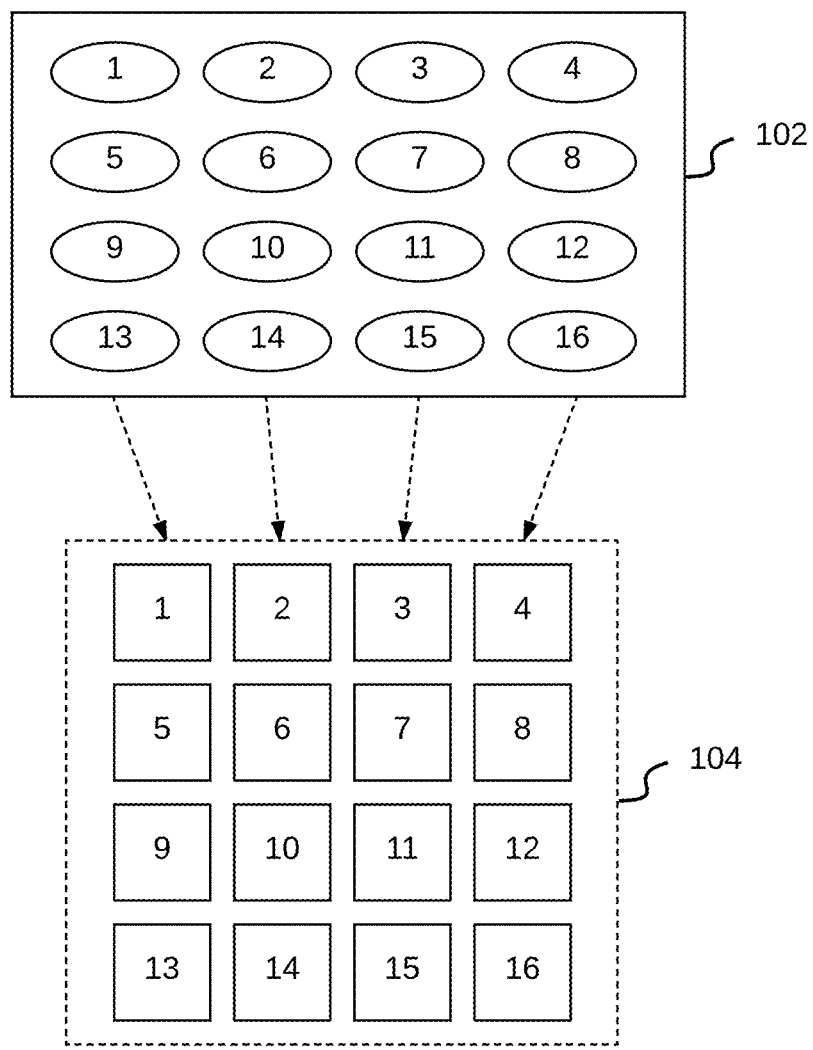
FIG. 1 illustrates a plurality of lenses in a camera that captures a plurality of images, in which various embodiments may be employed.

Additional illustrative embodiments are listed below. In one embodiment, a plurality of lenses 102 in a camera (not shown in FIG. 1) that captures a plurality of images is illustrated in FIG. 1, in which various embodiments may be employed. The camera may be dash camera installed on a vehicle or any digital camera used for personal or professional photography. Plurality of lenses 102 includes sixteen lenses, which have been numbered from 1 to 16 for illustrative purpose. Plurality of lenses 102 may be arranged in such a way that each of plurality of lenses 102 capture the same field of view. It will be apparent to a person skilled in the art that plurality of lenses 102 may include any number of lenses that is less than or more than sixteen. As depicted, lenses in plurality of lenses 102 are arranged as a lens array in square shape. Alternatively, the lens array may be in a rectangular shape or may have any random shape. Lenses in plurality of lenses 102 may be placed in a circular arrangement forming concentric circles. In an embodiment, arrangement of the lenses may be automatically adapted based on an environment in which the images are being captured. An environment may include one or more of rain, fog, dust, lighting conditions, landscape, or an obstacle. By way of an example, the arrangement of lens array may be adapted to be more densely spaced in case of fog and more sparsely spaced in case of a light drizzle.

Each of the sixteen lenses in plurality of lenses 102 has a dedicated sensor, such that each of the sixteen lenses capture a separate image, resulting in a plurality of images 104 that includes sixteen different images. As depicted, an image captured by a lens has been assigned the same number as the lens that captured the image. Each image of plurality of images 104 is captured for the same field of view. In other words, in absence of any obstruction in each of plurality of lenses 102, each of plurality of images 104 may be exactly same. In an embodiment, each of plurality of images 104 are low resolution images, which are later combined to generate a single high resolution image. Various methods used to combine plurality of images 104 to generate the single high resolution images are explained in detail in conjunction with FIG. 4 to FIG. 8. It will be apparent to a person skilled in the art that each of plurality of images 104 may be frames extracted from a video recorded by plurality of lenses 102.

One or more of plurality of lenses 102 may be obstructed because of being exposed to an external environment, for example, rain drops, dirt, fog, or mud. As a result, one or more of resultant images captured by plurality of lenses 102 may be partially or completely distorted. The resultant images are then combined to generate a single high resolution image based on the degree of distortion in one or more of the resultant images. This scenario is further explained in detail in conjunction with FIG. 2.

Figure 2:
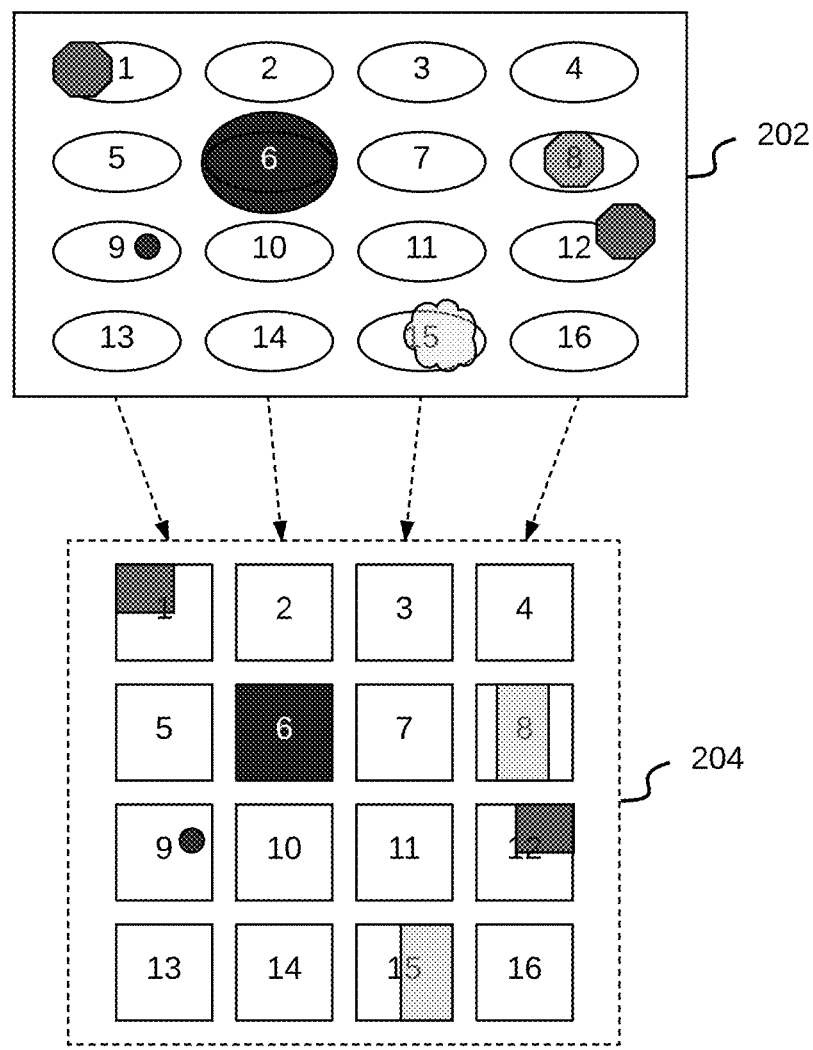
FIG. 2 illustrates a plurality of lenses in a camera obstructed because of an external environment and a plurality of images captured by the plurality of lenses, in accordance with an embodiment.

Referring now to FIG. 2, a plurality of lenses 202 in a camera obstructed because of an external environment and a plurality of images 204 captured by plurality of lenses 202 are illustrated, in accordance with an embodiment. As a result of the external environment (for example, rain, fog, dust, lighting conditions, landscape, or an obstacle), field of view of one or more of plurality of lenses 202 may be obstructed. By way of an example, rain drops, mud, or dust particles may get deposited on surface of one or more of plurality of lenses 202. As depicted in FIG. 2, lens number 6 in plurality of lenses 202 is completely obstructed because of mud deposited on it. Similarly, lenses with numbers: 1, 8, 9, 12, and 15, are partially obstructed to varying degrees because of dust or rain drops deposited on surface of these lenses. By way of another example, frequently occurring obstacles (for example, car wipers, road signage, trees), may also obstruct view of one or more of plurality of lenses 202. In an embodiment, the camera may be trained to identify these obstacles and ignore obstructions caused by these obstacles. This is further explained in conjunction with FIG. 5.

Plurality of lenses 202, under influence of the external environment, captures plurality of images 204. As depicted in FIG. 2, images within plurality of images 204 captured by lenses that were obstructed due to external environment in plurality of lenses 202 are distorted. By way of an example, the image captured through the lens that is numbered 6, is completely distorted. Similarly, the degree of partial distortion in the images captured by the lenses numbered 1, 8, 9, 12, and 15, varies based on the degree of obstruction in an associated lens.

Plurality of images 204 thus includes multiple completely or partially distorted images that are later combined to generate a single image, which is distortion free and has a high resolution. In other words, as some of the images in plurality of images 204 end up losing information as a result of partial or complete distortion, they are combined to generate a distortion free image that captures complete information of a field of view being captured by plurality of lenses 202. Various methods used to combine plurality of images 204 to generate a single distortion free image that has a high resolution are explained in detail in conjunction with FIG. 4 to FIG. 8.

Figure 3:
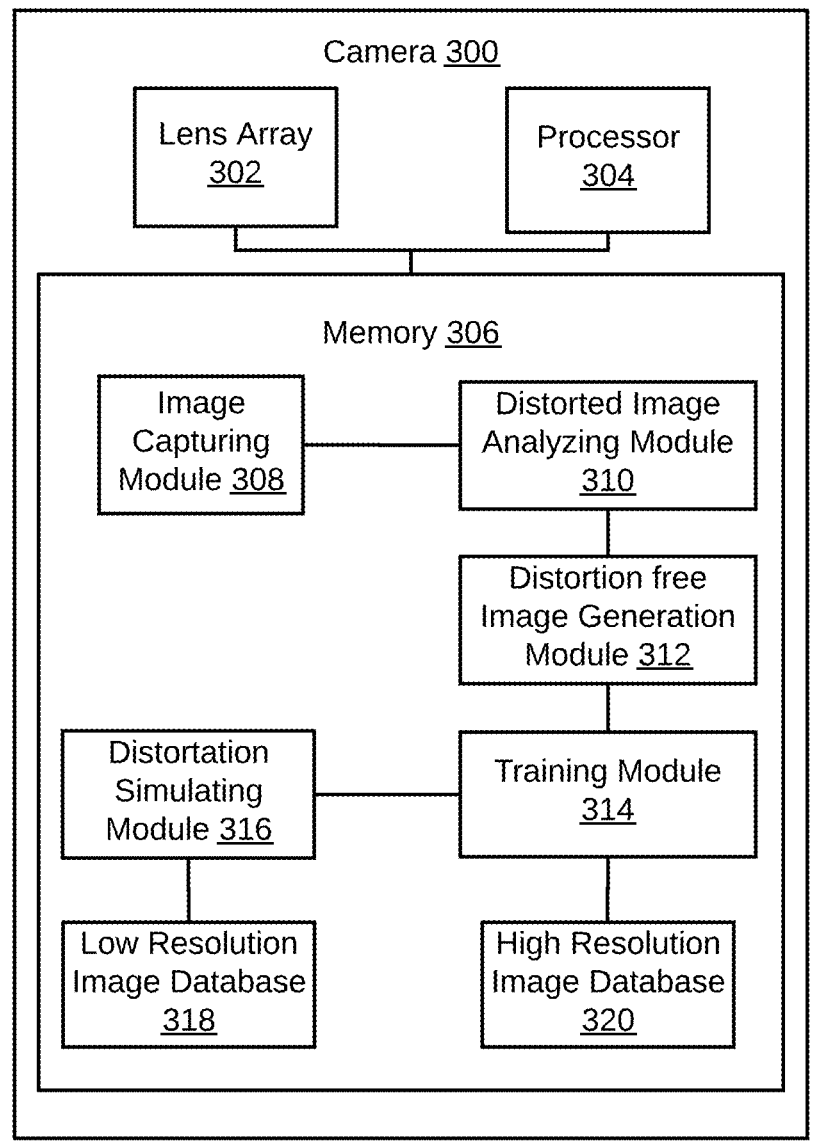
FIG. 3 is a block diagram of various modules within a camera that enable generation of a distortion free image, in accordance with an embodiment.

Referring now to FIG. 3, a block diagram of various modules within a camera 300 that enable generation of a distortion free image is illustrated, in accordance with an embodiment. Camera 300 may be a digital camera used as a dash camera installed on a vehicle or as a camera used for personal or professional photography. Camera 300 includes a lens array 302 that includes a plurality of lenses, such that, each of the plurality of lenses has a dedicated sensor. In other words, each lens captures an independent image. This has already been explained in detail in conjunction with FIG. 1. In an embodiment, lens surface of camera 300 may be divided into a grid and each individual element (or lens) of the grid is capable of forming an independent image. The images thus formed by lens array 302 may be an array of low resolution images.

Camera 300 further includes a processor 304, which is communicatively coupled to lens array 302, and a memory 306 that is operatively coupled to each of processor 304 and lens array 302. Memory 306 includes instructions stored thereon, that cause processor 304, on execution to generate the distortion free image. Memory 306 may be a non-volatile memory or a volatile memory. Examples of non-volatile memory, may include, but are not limited to a flash memory, a Read Only Memory (ROM), a Programmable ROM (PROM), Erasable PROM (EPROM), and Electrically EPROM (EEPROM) memory. Examples of volatile memory may include, but are not limited Dynamic Random Access Memory (DRAM), and Static Random-Access memory (SRAM).

These instructions in memory 306 may be stored as various modules, i.e., an image capturing module 308, a distorted image analyzing module 310, a distortion free image generation module 312, a training module 314, and a distortion simulating module 316. Image capturing module 308 is configured to capture a plurality of images in real time through the plurality of lenses in lens array 302. The plurality of images may be an array of low resolution images that have the same field of view. The plurality of images may include one or more distorted images because of being captured in one or more environment. This has been explained in detail in conjunction with FIG. 2.

Once the plurality of images is captured, distorted image analyzing module 310 analyzes the plurality of images in order to identify distorted images. To this end, distorted image analyzing module 310 may also identify distorted pixels in each of the plurality of images. A deep learning technique or a neural network may be used for this identification. After identification of distorted images, distortion free image generation module 312 generates a single distortion free image that has a high resolution using the deep learning technique. The methods used for generating the single distortion free image are further explained in detail in conjunction with FIG. 4-7 and FIG. 9.

Training module 314 trains the deep learning technique to generate the single distortion free image from the plurality of images. To this end, training module 314 creates a mapping of each of a plurality of sets of low resolution images to an associated distortion free image that has a high resolution. Each set of low resolution images is stored in a low resolution image database 318 and each associated distortion free image that has a high resolution is stored in a high resolution image database 320. In other words, a set of low resolution images is mapped to one distortion free image, which are all captured for the same field of view. The method used for training the deep learning technique is explained in detail in conjunction with FIG. 4 and FIG. 5.

In order to make sure that each set of low resolution images includes one or more distorted images, distortion simulating module 316 generates each set of low resolution images in one or more environments. An environment, for example, may include, but is not limited to rain, fog, dust, lighting conditions, landscape, or an obstacle. Alternatively, distortion simulating module 316 may augment distortions in one or more distortion free low resolution images stored in low resolution image array database 318. This is further explained in detail in conjunction with FIG. 4 and FIG. 5.

Figure 4:
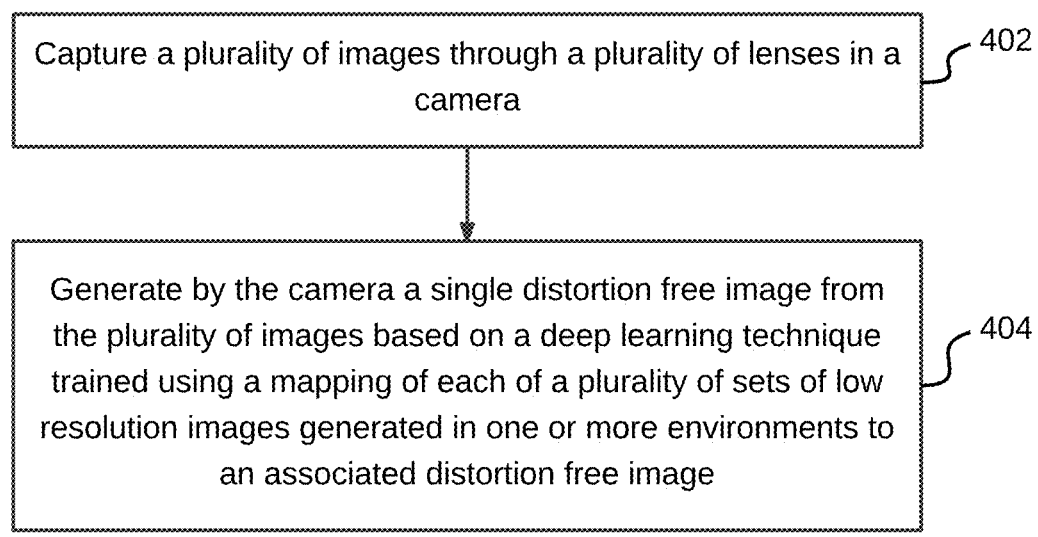
FIG. 4 illustrates a flowchart of a method of generating a distortion free image using a camera, in accordance with an embodiment.

Referring now to FIG. 4, a flowchart of a method of generating a distortion free image using a camera is illustrated, in accordance with an embodiment. The camera, for example, may be camera 300 discussed in FIG. 3. At step 402, a plurality of images is captured through a plurality of lenses in the camera. Each of the plurality of lenses has a dedicated sensor. In other words, each lens captures a separate image for the same field of view. In absence of any obstruction settled on surface of one or more of the plurality of lenses, each of the plurality of images would be the same. However, in case an obstruction settles on the surface of one or more of the plurality of lenses, one or more of the plurality of images may be partially or completely distorted.

Once the plurality of images is captured, a single distortion free image is generated by the camera from the plurality of images based on a deep learning technique at step 404. In an embodiment, each of the plurality of images is a low resolution image and the single distortion free image is a high resolution image. The deep learning technique may be a neural network, for example, the Convolutional Neural Network (CNN). In other embodiments, Autoencoders can be used to enhance the image quality.

The deep learning technique may be trained using mapping of each of a plurality of sets of low resolution images to an associated distortion free image. In other words, a set of low resolution images is mapped to one distortion free image, which are all captured for the same field of view. Each set of low resolution images may be generated in one or more environments, such that, one or more low resolution images in each set are distorted. An environment, for example, may include, but is not limited to rain, fog, dust, lighting conditions, landscape, or an obstacle. The one or more environments may be simulated in order to generate the one or more low resolution images that are distorted. Alternatively, distortions in one or more low resolution images may be augmented using a software.

In order to map each image in a set of low resolution images captured in a given environment to a distortion free image, each image in the set is correlated with the distortion free image. Using this correlation, the deep learning technique or the neural network (for example, CNN) is trained to assign relevance to each image in the plurality of images captured using the plurality of lenses. The deep learning technique may also be trained to assign relevance to each pixel in each image of the plurality of images. Based on the assigned relevance, the deep learning technique combines the plurality of images to generate the single distortion free image that has a high resolution. This is further explained in detail in conjunction with FIG. 5.

Figure 5:
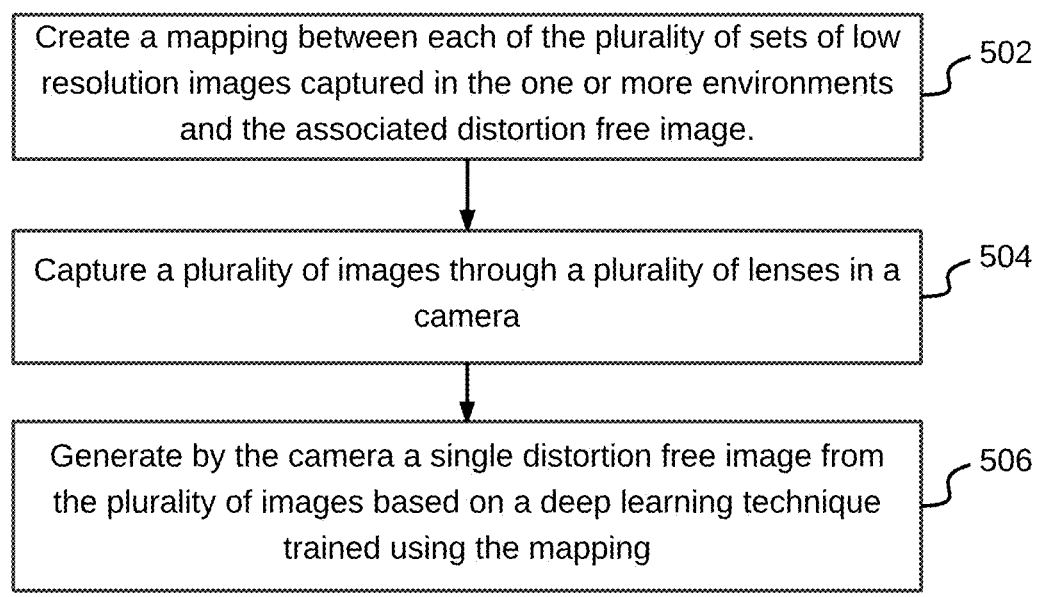
FIG. 5 illustrates a flowchart of a method of generating a distortion free image using a mapping created between low resolution images and associated distortion free images, in accordance with an embodiment.

Referring now to FIG. 5, a flowchart of a method of generating a distortion free image using a mapping created between low resolution images and associated distortion free images is illustrated, in accordance with an embodiment. At step 502, a mapping is created between each of a plurality of sets of low resolution images captured in the one or more environments and an associated distortion free image. To create the mapping, a distortion free image that has a high resolution may first be captured for a given field of view using a high resolution camera. Thereafter, with the same field of view in the background, an environment (for example, rain) may be simulated and a plurality of low resolution images may be captured using a plurality of lenses of a camera (for example, plurality of lenses 202). One or more of the plurality of low resolution images may be partially or completely distorted as a result of an obstruction (for example, rain drops) settling on surface of one or more of the plurality of lenses. The plurality of low resolution images, some of which are partially or completely distorted, are then correlated with the distortion free image that has a high resolution.

In order to correlate a low resolution image (whether distorted or not) to the distortion free image, each pixel in the low resolution image is mapped to a corresponding pixel of the distortion free image. Based on the correlation, relevance in the form of weights may be assigned to each pixel of the low resolution image in the mapping. By way of an example, an exact match is assigned the highest weight and a pixel in a low resolution image that is completely different from an associated pixel in the distortion free image is assigned a zero weight. In a similar manner, multiple such mappings are created for each plausible environment or various combinations of such environmental factors. Thus, multiple real life scenarios are created, where low resolution images captured through the plurality of lenses under influence of a particular environment (for example, rain), when combined, generate a single distortion free image that has a high resolution.

This correlation is then used to train the deep learning technique (for example, CNN) regarding relevance that should be assigned to pixels in each of the plurality of low resolution images or to each low resolution image as a whole, while combining them, in order to generate the single distortion free image for a particular environment. In an embodiment, relevance may be established by assigning weights to each pixel in each low resolution image or to each low resolution image as a whole.

The deep learning technique is also trained using this correlation to identify various frequently occurring obstacles (for example, car wipers, road signage, trees, concrete structures, other vehicles) that may obstruct a field of view for one or more of the plurality of lenses. Accordingly, the deep learning technique may be trained to ignore distortions caused by such frequently occurring obstacles. The deep learning technique or the neural network is thus trained to generate single distortion free image in multiple real life scenarios.

At step 504, a plurality of images is captured through a plurality of lenses in a camera. Thereafter, at step 506, a single distortion free image is generated from the plurality of images using the deep learning technique. As the deep learning technique is trained using the mappings created at step 502, the deep learning technique combines the plurality of images to generate the single image. In an embodiment, the plurality of images may include one or more distorted images because of being captured in one or more environments (for example, rain, mud, or a combination thereof). The deep learning technique may use different methods, based on the training, to generate a single distortion free image that has a high resolution from the plurality of images of low resolution. By way of an example and referring back to FIG. 2, six images in plurality of images 204 are partially or completely distorted. Based on the training, the deep learning technique combines plurality of images 204 to generate a single distortion free image that has a high resolution. The methods used to generate a single distortion free image are further explained in detail in conjunction with FIG. 6, FIG. 7, and FIG. 9.

Figure 6:
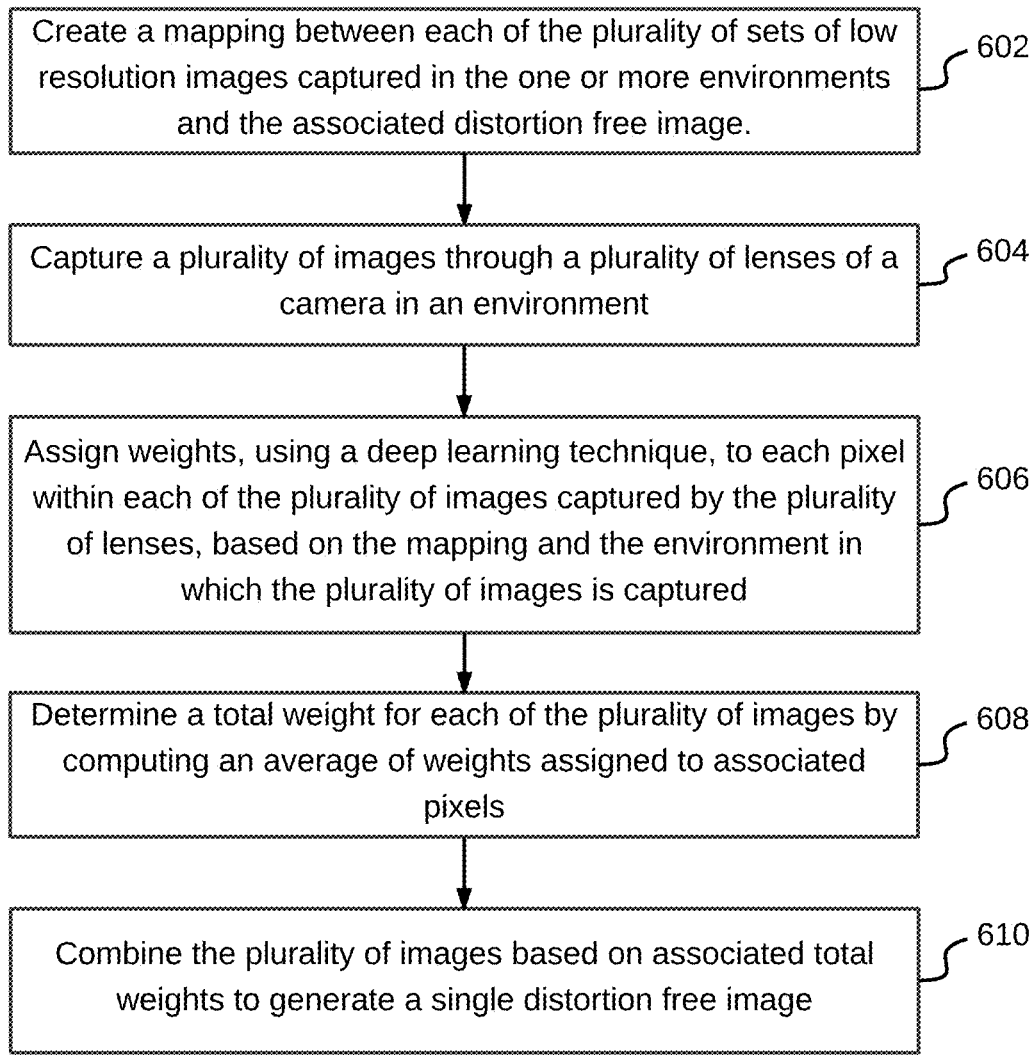
FIG. 6 illustrates a flowchart of a method of generating a distortion free image based on weights assigned to each of a plurality of images captured by a plurality of lenses in a camera, in accordance with another embodiment.

Referring now to FIG. 6, a flowchart of a method of generating a distortion free image based on weights assigned to each of a plurality of images captured by a plurality of lenses in a camera is illustrated, in accordance with an embodiment. At step 602, a mapping is created between each of a plurality of sets of low resolution images captured in the one or more environments and an associated distortion free image. This has already been discussed in detail in conjunction with FIG. 5. At step 604, a plurality of images is captured through a plurality of lenses of the camera in an environment. Each of the plurality of images may have a low resolution. As the plurality of images are captured under influence of the environment, the plurality of images may include one or more distorted images. A distorted image is one that includes a plurality of distorted pixels. By way of an example, plurality of images 204 may be captured during rain and includes six distorted images that are partially or completely distorted. The distortions are caused because of rain drops settling on six lenses in plurality of lenses 202.

Based on the environment in which the plurality of images is captured and the mapping, the deep learning technique, at step 606, assigns weights to each pixel within each of the plurality of images. A distorted pixel is assigned zero weight. In other words, the deep learning technique first determines the environment in which the plurality of images is captured. Accordingly, the deep learning technique uses a mapping created for that environment to assign weights to each pixel, a distorted pixel being assigned zero weight. In continuation of the example given above, as plurality of images 204 is captured during rain, the deep learning technique uses the mapping created for rain to assign weights to each pixel in each image of plurality of images 204. In plurality of images 204, each pixel in the image that is numbered six, is assigned a zero weight, as this image is completely distorted.

Once weights have been assigned to each pixel of each image in the plurality of images, a total weight is determined for each of the plurality of images at step 608. Total weight for an image of the plurality of images may be determined by computing an average of weights assigned to pixels in the image. In continuation of the example given above, the image that is numbered 6 in plurality of images 204 would have a total weight of zero, as each pixel in this image is distorted. Based on total weights determined at step 608, images in the plurality of images are combined at step 610 to generate a single distortion free image. The single distortion free image may have a high resolution as it is generated by combining multiple images of low resolution. In continuation of the example given above, images in plurality of images 204, except the images numbered 1, 6, 8, 9, 12, and 15, are distortion free and are thus given equal weightage while combining. However, the image that is numbered 6, would not be considered while combining images in plurality of images 204, as this image has a total weight of zero. In other words, this image will be discarded.

Figure 7:
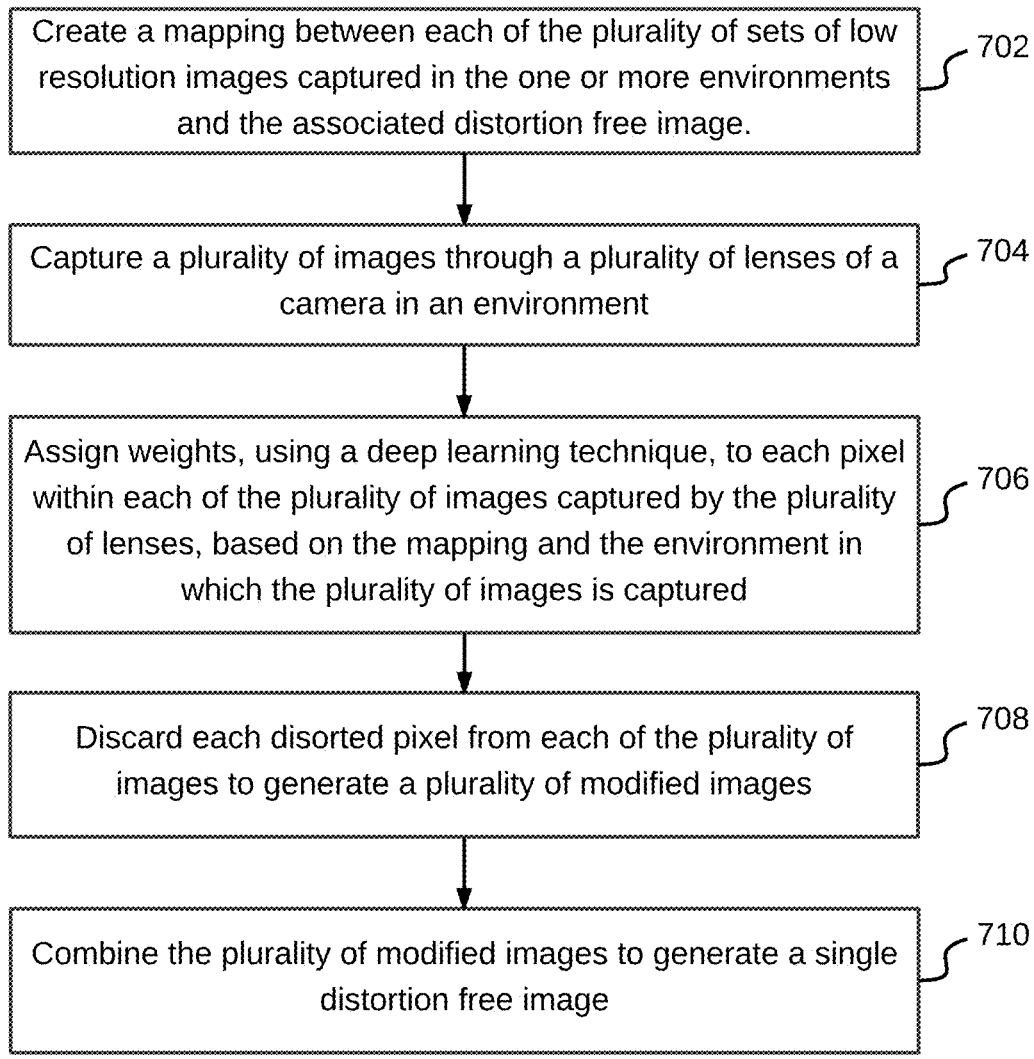
FIG. 7 illustrates a flowchart of a method of generating a distortion free image from a plurality of images captured by a camera by discarding distorted pixels from each of the plurality of images, in accordance with an embodiment.

Referring now to FIG. 7, a flowchart of a method of generating a distortion free image from a plurality of images captured by a camera by discarding distorted pixels from each of the plurality of images is illustrated, in accordance with an embodiment. At step 702, a mapping is created between each of a plurality of sets of low resolution images captured in the one or more environments and an associated distortion free image. This has already been discussed in detail in conjunction with FIG. 5. At step 704, a plurality of images is captured through a plurality of lenses of the camera in an environment. Each of the plurality of images may have a low resolution. As the plurality of images are captured under influence of the environment, the plurality of images may include one or more distorted images.

Based on the environment in which the plurality of images is captured and the mapping, the deep learning technique, at step 706, assigns weights to each pixel within each of the plurality of images. A distorted pixel is assigned zero weight. Based on this, each distorted pixel (which is assigned zero weight) in each of the plurality of images is discarded at step 708 to generate a plurality of modified images. In other words, only distorted pixels in an image are discarded, the remaining pixels in the image are retained resulting in a modified image. Thus, only a portion of the image is discarded to generate the modified image. By way of an example and referring to FIG. 2, as each pixel in the image numbered 6 is distorted, this image is completely discarded. Similarly, half of the image numbered 15 includes distorted pixels, thus only half portion of this image is discarded, thereby generating a modified image that includes the remaining half portion of the image numbered 15.

At step 710, images in the plurality of modified images are combined to generate a single distortion free image. This method enables reusing distortion free portion of a low resolution image. In a scenario, four partially distorted images are captured through four lenses of a camera for a particular field of view. Due to obstruction caused by mud deposited on each of the four lenses, a unique area of the field of view is distorted in each of the four distorted images. As a result, the remaining distortion free portion in each of the four distorted images may be combined to generate a single distortion free image for that field of view.

Figure 8:
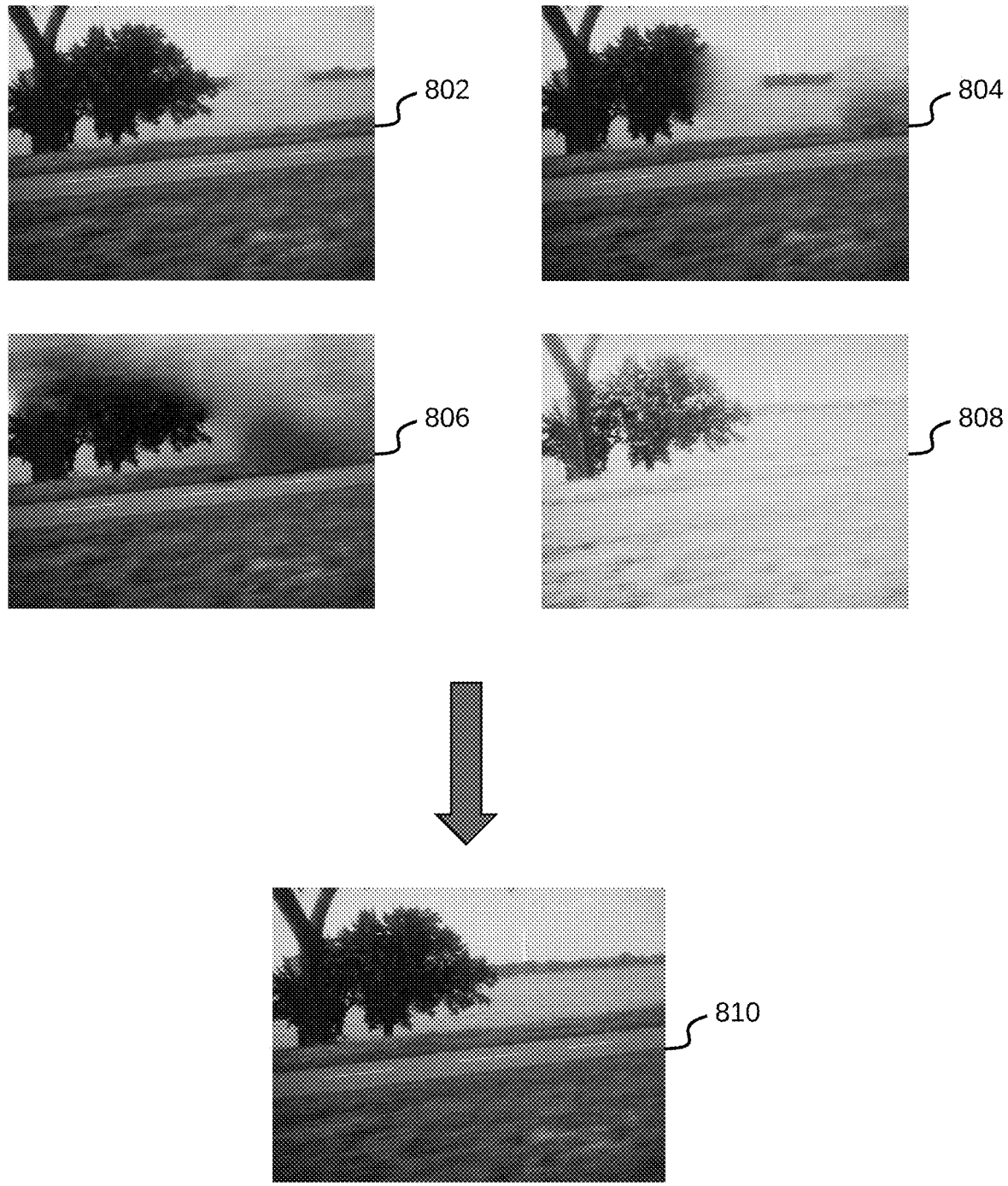
FIG. 8 illustrates four images captured by four lenses of a camera during a drizzle and a single distortion free image generated by combining the four images are illustrated, in accordance with an exemplary embodiment.

Referring to FIG. 8, four images captured by four lenses of a camera during a drizzle and a single distortion free image generated by combining the four images are illustrated, in accordance with an exemplary embodiment. The camera (for example, camera 300) includes an array of four lenses (not shown in FIG. 8). These four lenses are used to capture a field of view during a drizzle and result in four low resolution images, i.e., an image 802, an image 804, an image 806, and an image 808. Each of images 802, 804, and 806 have varying degrees of distortion caused by rain drops settling on surface of associated lenses. Image 808, however, is distorted because of a lighting condition. The methods discussed in either of FIG. 4, FIG. 5, FIG. 6, or FIG. 7 or a combination thereof, may be used to combine images 802-808 in order to generate an image 810, which is a distortion free image and has a high resolution.

Figure 9:
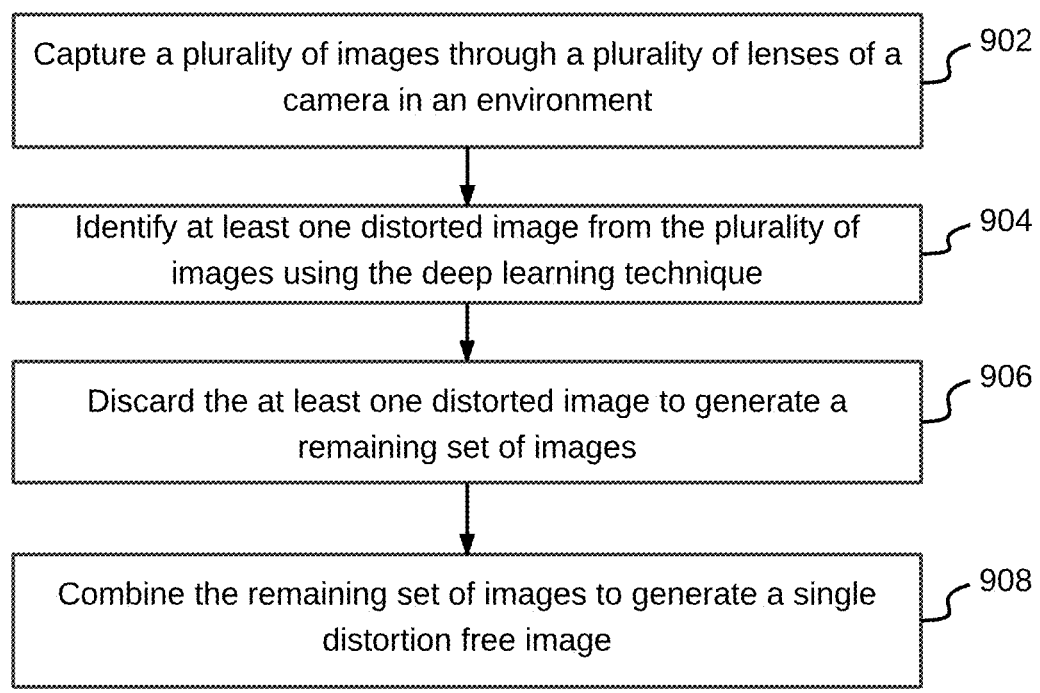
FIG. 9 illustrates a flowchart of method of generating a distortion free image from a plurality of images captured using a camera by discarding each distorted image in the plurality of images, in accordance with an embodiment.

Referring now to FIG. 9, a flowchart of a method of generating a distortion free image from a plurality of images captured using a camera by discarding each distorted image in the plurality of images is illustrated, in accordance with an embodiment. At step 902, a plurality of images is captured through a plurality of lenses of the camera in an environment. As a result of the influence of the environment, the plurality of images includes one or more distorted images, which may be partially or completely distorted. At step 904, the deep learning technique is used to identify the one or more distorted images. The deep learning technique may use a mapping associated with the environment to identify the one or more distorted images.

At step 906, the one or more distorted images are discarded to generate a remaining set of images. In other words, a distorted image, whether completely or partially distorted, is discarded. When compared to methods discussed in FIG. 6 and FIG. 7, this is a simpler approach. In an embodiment, a distortion threshold may be fixed, such that, a distorted image is discarded only when the percentage of distortion in that distorted image is above the distortion threshold. By way of an example, the distortion threshold is fixed at 50 percent. Thus, only those distorted images are discarded in which the percentage of distortion is above 50 percent.

At step 908, the remaining set of images in the plurality of images are combined to generate a single distortion free image. By way of an example and referring to FIG. 2, the images numbered 1, 6, 8, 9, 12, and 15, are partially or completely distorted. Thus, these images are discarded from plurality of images 204 leaving the images numbered 2, 3, 4, 5, 7, 10, 11, 13, 14, and 16. These images are then combined to generate a single distortion free image that has a high resolution.

Figure 10:
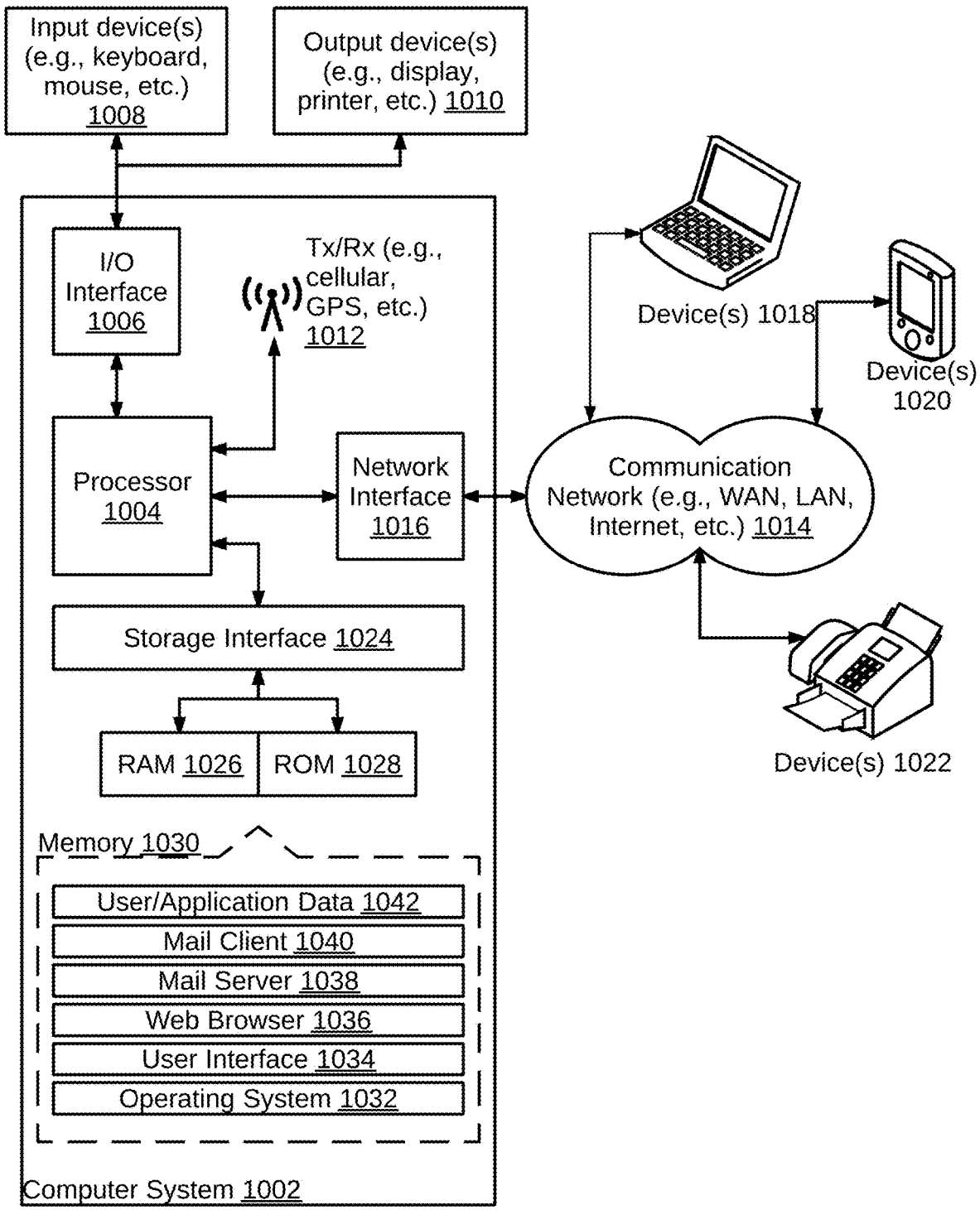
FIG. 10 illustrates a block diagram of an exemplary computer system for implementing various embodiments.

Referring now to FIG. 10, a block diagram of an exemplary computer system for implementing various embodiments is illustrated. Computer system 1002 may include a central processing unit ("CPU" or "processor") 1004 that includes at least one data processor for executing program components for executing user-generated requests or system-generated requests. A user may include a person, a person using a device such as such as those included in this disclosure, or such a device itself. Processor 1004 may include specialized processing units such as integrated system (bus) controllers, memory management control units, floating point units, graphics processing units, digital signal processing units, etc. Processor 1004 may include a microprocessor, such as AMD® ATHLON® microprocessor, DURON® microprocessor OR OPTERON® microprocessor, ARM's application, embedded or secure processors, IBM® POWERPC®, INTEL'S CORE® processor, ITANIUM® processor, XEON® processor, CELERON® processor or other line of processors, etc. Processor 1004 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 1004 may be disposed in communication with one or more input/output (I/O) devices via an I/O interface 1006. I/O interface 1006 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using I/O interface 1006, computer system 1002 may communicate with one or more I/O devices. For example, an input device 1008 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. An output device 1010 may be a printer, fax machine, video display (e.g., cathode ray tube (CRT), liquid crystal display (LCD), light-emitting diode (LED), plasma, or the like), audio speaker, etc. In some embodiments, a transceiver 1012 may be disposed in connection with processor 1004. Transceiver 1012 may facilitate various types of wireless transmission or reception. For example, transceiver 1012 may include an antenna operatively connected to a transceiver chip (e.g., TEXAS® INSTRUMENTS WILINK WL1283® transceiver, BROADCOM® BCM4550IUB8® transceiver, INFINEON TECHNOLOGIES® X-GOLD 618-PMB9800® transceiver, or the like), providing IEEE 802.11a/b/g/n, Bluetooth, FM, global positioning system (GPS), 2G/3G HSDPA/HSUPA communications, etc.

In some embodiments, processor 1004 may be disposed in communication with a communication network 1014 via a network interface 1016. Network interface 1016 may communicate with communication network 1014. Network interface 1016 may employ connection protocols including, without limitation, direct connect, Ethernet (e.g., twisted pair 50/500/5000 Base T), transmission control protocol/internet protocol (TCP/IP), token ring, IEEE 802.11a/b/g/n/x, etc. Communication network 1014 may include, without limitation, a direct interconnection, local area network (LAN), wide area network (WAN), wireless network (e.g., using Wireless Application Protocol), the Internet, etc. Using network interface 1016 and communication network 1014, computer system 1002 may communicate with devices 1018, 1020, and 1022. The devices may include, without limitation, personal computer(s), server(s), fax machines, printers, scanners, various mobile devices such as cellular telephones, smartphones (e.g., APPLE® IPHONE® smartphone, BLACKBERRY® smartphone, ANDROID® based phones, etc.), tablet computers, eBook readers (AMAZON® KINDLE® ereader, NOOK® tablet computer, etc.), laptop computers, notebooks, gaming consoles (MICRO- SOFT® XBOX® gaming console, NINTENDO® DS® gaming console, SONY® PLAYSTATION® gaming console, etc.), or the like. In some embodiments, computer system 1002 may itself embody one or more of the devices.

In some embodiments, processor 1004 may be disposed in communication with one or more memory devices (e.g., RAM 1026, ROM 1028, etc.) via a storage interface 1024. Storage interface 1024 may connect to memory 1030 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 1030 may store a collection of program or database components, including, without limitation, an operating system 1032, user interface application 1034, web browser 1036, mail server 1038, mail client 1040, user/application data 1042 (e.g., any data variables or data records discussed in this disclosure), etc. Operating system 1032 may facilitate resource management and operation of computer system 1002. Examples of operating systems 1032 include, without limitation, APPLE® MACINTOSH® OS X platform, UNIX platform, Unix-like system distributions (e.g., Berkeley Software Distribution (BSD), FreeBSD, NetBSD, OpenBSD, etc.), LINUX distributions (e.g., RED HAT®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS platform, or the like. User interface 1034 may facilitate display, execution, interaction, manipulation, or operation of program components through textual or graphical facilities. For example, user interfaces may provide computer interaction interface elements on a display system operatively connected to computer system 1002, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (e.g., AERO® platform, METRO® platform, etc.), UNIX X-WINDOWS, web interface libraries (e.g., ACTIVEX® platform, JAVA® programming language, JAVASCRIPT® programming language, AJAX® programming language, HTML, ADOBE® FLASH® platform, etc.), or the like.

In some embodiments, computer system 1002 may implement a web browser 1036 stored program component. Web browser 1036 may be a hypertext viewing application, such as MICROSOFT® INTERNET EXPLORER® web browser, GOOGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. Web browsers may utilize facilities such as AJAX, DHTML, ADOBE® FLASH® platform, JAVASCRIPT® programming language, JAVA® programming language, application programming interfaces (APis), etc. In some embodiments, computer system 1002 may implement a mail server 1038 stored program component. Mail server 1038 may be an Internet mail server such as MICROSOFT® EXCHANGE® mail server, or the like. Mail server 1038 may utilize facilities such as ASP, ActiveX, ANSI C++/C#, MICROSOFT .NET® programming language, CGI scripts, JAVA® programming language, JAVASCRIPT® programming language, PERL® programming language, PHP® programming language, PYTHON® programming language, WebObjects, etc. Mail server 1038 may utilize communication protocols such as internet message access protocol (IMAP), messaging application programming interface (MAPI), Microsoft Exchange, post office protocol (POP), simple mail transfer protocol (SMTP), or the like. In some embodiments, computer system 1002 may implement a mail client 1040 stored program component. Mail client 1040 may be a mail viewing application, such as APPLE MAIL® mail client, MICROSOFT ENTOURAGE® mail client, MICROSOFT OUTLOOK® mail client, MOZILLA THUNDERBIRD® mail client, etc.

In some embodiments, computer system 1002 may store user/application data 1042, such as the data, variables, records, etc. as described in this disclosure. Such databases may be implemented as fault-tolerant, relational, scalable, secure databases such as ORACLE® database OR SYBASE® database. Alternatively, such databases may be implemented using standardized data structures, such as an array, hash, linked list, struct, structured text file (e.g., XML), table, or as object-oriented databases (e.g., using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiments of the invention provide camera for generation distortion free images and method thereof. The invention provides a more accurate and more reliable imaging system, when compared with conventional systems. Multiple low resolution images, some of which are distorted because of external environmental factors, are combined to generate a single distortion free image that has a high resolution. The use of a lens array that includes multiple lenses provides a better mechanism to capture the field of view in the front even in presence external environmental factors, for example, rain drops or dust settling on the surface of one or more of the multiple lenses. As a result, failure or inaccuracy of the decision making system in a vehicle caused by distorted images is avoided.

The specification has described camera for generation distortion free images and method thereof. The illustrated steps are set out to explain the exemplary embodiments shown, and it should be anticipated that ongoing technological development will change the manner in which particular functions are performed. Examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of generating distortion free images, the method comprising:
    capturing a plurality of images through a plurality of lenses in a camera, wherein each of the plurality of lenses has a dedicated sensor; and
    generating, by the camera, a single distortion free image from the plurality of images based on a deep learning technique trained using a mapping of each of a plurality of sets of low resolution images generated in one or more environments to an associated distortion free image, wherein one or more low resolution images in each of the plurality of sets are distorted by the plurality of lenses, based on mapping and an environment in which the plurality of images is captured, wherein a distorted pixel is assigned zero weight and wherein generating the single distortion free image comprises the processor to assign weights, using the deep learning technique, to each pixel within each of the plurality of images captured, and wherein the weights to each pixel is assigned by the processor based on:
        determining an environment associated with each image from the plurality of images; and
        assigning a weight to each pixel of each image from the plurality of images, based on a mapping created between the environment and a corresponding weight.

2. The method of claim 1, wherein generating comprises identifying at least one distorted image from the plurality of images using the deep learning technique, wherein each of the at least one distorted image comprises a plurality of distorted pixels.

3. The method of claim 2, wherein generating further comprises:
    discarding the at least one distorted image; and
    combining a remaining set of images in the plurality of images to generate the single distortion free image, wherein the remaining set of images is obtained after discarding the at least one distorted image.

4. The method of claim 2, wherein each pixel in each image within a set from the plurality of sets of low resolution images is mapped to a corresponding pixel of the associated distortion free image in the mapping.

5. The method of claim 4, further comprising determining a total weight for each of the plurality of images by computing an average of weights assigned to associated pixels.

6. The method of claim 5, further comprising combining the plurality of images based on associated total weights to generate the single distortion free image.

7. The method of claim 1, further comprising:
    discarding each distorted pixel from each of the plurality of images to generate a plurality of modified images; and
    combining the plurality of modified images obtained after discarding each distorted pixel from each of the plurality of images to generate the single distortion free image.

8. The method of claim 1, wherein each of the plurality of images are low resolution images and the single distortion free image is a high resolution image.

9. The method of claim 1, wherein the one or more environments comprise at least one of rain, fog, dust, lighting conditions, landscape, or an obstacle.

10. The method of claim 1, wherein the plurality of lenses is arranged as a lens array in the camera.

11. The method of claim 1, wherein the one or more environments are simulated to generate the plurality of sets of low resolution images used to create the mapping.

12. A camera comprising:
    a plurality of lenses, wherein each of the plurality of lenses has a dedicated sensor;
    a processor communicatively coupled to the plurality of lenses; and
    a memory communicatively coupled to the processor and having instructions stored thereon, causing the processor, on execution to:
        capture a plurality of images through the plurality of lenses; and
        generate a single distortion free image from the plurality of images based on a deep learning technique trained using a mapping of each of a plurality of sets of low resolution images generated in one or more environments to an associated distortion free image, wherein one or more low resolution images in each of the plurality of sets are distorted and wherein generating the single distortion free image comprises the processor to assign weights, using the deep learning technique, to each pixel within each of the plurality of images captured by the plurality of lenses, based on mapping and an environment in which the plurality of images is captured, wherein a distorted pixel is assigned zero weight, and wherein the weights to each pixel is assigned by the processor based on:
            determining an environment associated with each image from the plurality of images; and
            assigning a weight to each pixel of each image from the plurality of images, based on a mapping created between the environment and a corresponding weight.

13. The camera of claim 12, wherein processor instructions further cause the processor to identify at least one distorted image from the plurality of images using the deep learning technique, wherein each of the at least one distorted image comprises a plurality of distorted pixels.

14. The camera of claim 12, wherein processor instructions further cause the processor to:
   discard the at least one distorted image; and
   combine a remaining set of images in the plurality of images to generate the single distortion free image, wherein the remaining set of images is obtained after discarding the at least one distorted image.

15. The camera of claim 12, wherein each pixel in each image within a set from the plurality of sets of low resolution images is mapped to a corresponding pixel of the associated distortion free image in the mapping.

16. The camera of claim 12, wherein processor instructions further cause the processor to determine a total weight for each of the plurality of images by computing an average of weights assigned to associated pixels.

17. The camera of claim 16, wherein processor instructions further cause the processor to combine the plurality of images based on associated total weights to generate the single distortion free image.

18. The camera of claim 12, wherein processor instructions further cause the processor to:
   discard each distorted pixel from each of the plurality of images to generate a plurality of modified images; and
   combine the plurality of modified images obtained after discarding each distorted pixel from each of the plurality of images to generate the single distortion free image.

19. A non-transitory computer-readable storage medium that has a set of computer-executable instructions stored thereon, the set of computer-executable instructions causing a camera that includes one or more processors to perform steps including:
   capturing a plurality of images through a plurality of lenses in the camera, wherein each of the plurality of lenses has a dedicated sensor; and
   generating a single distortion free image from the plurality of images based on a deep learning technique trained using a mapping of each of a plurality of sets of low resolution images generated in one or more environments to an associated distortion free image, wherein one or more low resolution images in each of the plurality of sets are distorted and wherein generating the single distortion free image comprises the processor to assign weights, using the deep learning technique, to each pixel within each of the plurality of images captured by the plurality of lenses, based on mapping and an environment in which the plurality of images is captured, wherein a distorted pixel is assigned zero weight and wherein the weights to each pixel is assigned by the processor based on:
   determining an environment associated with each image from the plurality of images; and
   assigning a weight to each pixel of each image from the plurality of images, based on a mapping created between the environment and a corresponding weight.

* * * * *